(12) United States Patent
Hiron-Jones et al.

(10) Patent No.: US 10,948,319 B2
(45) Date of Patent: *Mar. 16, 2021

(54) ELECTRICAL PROCESS CONTROL SENSOR ASSEMBLIES

(71) Applicant: Longvale Limited, Burton on Trent (GB)

(72) Inventors: Ben Hiron-Jones, Burton on Trent (GB); Nathan Dear, Burton on Trent (GB)

(73) Assignee: LONGVALE LIMITED, Burton On Trent (GB)

( * ) Notice: Subject to any disclaimer, the term of this patent is extended or adjusted under 35 U.S.C. 154(b) by 64 days.

This patent is subject to a terminal disclaimer.

(21) Appl. No.: 16/053,159

(22) Filed: Aug. 2, 2018

(65) Prior Publication Data

US 2018/0340802 A1    Nov. 29, 2018

Related U.S. Application Data

(63) Continuation of application No. 15/666,097, filed on Aug. 1, 2017, now Pat. No. 10,054,469, which is a
(Continued)

(30) Foreign Application Priority Data

Jul. 14, 2015    (GB) .................................... 1512301

(51) Int. Cl.
*G01D 11/24*    (2006.01)
*G01D 11/26*    (2006.01)

(52) U.S. Cl.
CPC ........... *G01D 11/245* (2013.01); *G01D 11/26* (2013.01)

(58) Field of Classification Search
CPC ....... G01D 11/24; G01D 11/245; G01D 11/26
See application file for complete search history.

(56) References Cited

U.S. PATENT DOCUMENTS

| 3,041,880 A | 7/1962 | McCarvell et al. |
| 3,898,562 A | 8/1975 | Mizikar et al. |
| (Continued) | | |

FOREIGN PATENT DOCUMENTS

| DE | 2755354 A1 | 6/1979 |
| DE | 202012102916 U1 | 11/2013 |

OTHER PUBLICATIONS

Energizer NLPLROT Product Datasheet, commercially available at least as early as Sep. 2011. (Year: 2011).*
(Continued)

*Primary Examiner* — David A. Rogers
(74) *Attorney, Agent, or Firm* — Pearne & Gordon LLP

(57) ABSTRACT

An electrical process control sensor assembly 10 for sensing a process or machine parameter, the assembly 10 including a sensor body 12 and a head 14, the body 12 defining a body interior 20. The assembly includes a sensing device 22 at least partially located in the body interior 20. The head 14 defines a head interior 24 which communicates with the body interior 20. The assembly 10 includes a connector arrangement 26 located in the head interior 24. The assembly 10 includes internal communicating members 28 extending between the sensing device 22 and the connector arrangement 26, the connector arrangement 26 connecting, in an installed condition, the internal communicating members 28 to external communicating members 30 to permit electrical communication therebetween. The head 14 defines a port 34 through which the external connecting members 30 are located in the installed condition. The assembly 10 includes a mounting 48 for mounting the head 14 to the body
(Continued)

12 which is arranged to permit adjustment of the orientation of the head 14 relative to the body 12.

15 Claims, 14 Drawing Sheets

Related U.S. Application Data continuation of application No. 15/315,135, filed as application No. PCT/GB2016/051869 on Jun. 23, 2016, now Pat. No. 9,759,587.

(56) References Cited

U.S. PATENT DOCUMENTS

| | | | |
|---|---|---|---|
| 4,577,512 A | 3/1986 | Lowenheck | |
| 4,722,695 A | 2/1988 | Zwicker et al. | |
| 4,899,586 A | 2/1990 | Koneval et al. | |
| 4,967,593 A | 11/1990 | McQueen | |
| D361,057 S | 8/1995 | Fayfield | |
| D401,910 S | 12/1998 | Fooks | |
| D412,316 S | 6/1999 | Fayfield | |
| 5,922,953 A | 7/1999 | Payne et al. | |
| D442,563 S | 5/2001 | Fayfield | |
| 6,457,367 B1 * | 10/2002 | Behm | G01D 1/00 |
| | | | 73/753 |
| D470,462 S | 2/2003 | Fayfield | |
| 6,546,824 B2 | 4/2003 | Easton | |
| 7,102,078 B2 | 9/2006 | Weber | |
| 7,109,416 B1 | 9/2006 | Reed | |
| 7,301,329 B2 | 11/2007 | Borst et al. | |
| 7,476,848 B2 | 1/2009 | Argast et al. | |
| 8,353,211 B2 | 1/2013 | Vinshtok | |
| 9,030,190 B2 | 5/2015 | Matt | |
| 9,237,684 B2 * | 1/2016 | Ruf | G01F 23/00 |
| 9,255,823 B2 | 2/2016 | Dobele | |
| D770,462 S | 11/2016 | Gray | |
| 9,518,848 B2 | 12/2016 | Vinshtok | |
| 9,971,316 B2 * | 5/2018 | Jia | G05B 13/02 |
| 2001/0021607 A1 | 9/2001 | Schmid et al. | |
| 2002/0011115 A1 | 1/2002 | Frick | |
| 2003/0193328 A1 | 10/2003 | Iwashita | |
| 2005/0268732 A1 | 12/2005 | Fujita et al. | |
| 2006/0001417 A1 | 1/2006 | Clark | |
| 2006/0176639 A1 | 8/2006 | Hunter | |
| 2007/0007498 A1 | 1/2007 | Pyron | |
| 2007/0139041 A1 | 6/2007 | Steinich | |
| 2009/0095074 A1 | 4/2009 | Vinshtok et al. | |
| 2009/0095075 A1 | 4/2009 | Vinshtok et al. | |
| 2010/0308802 A1 | 12/2010 | Guibet | |
| 2011/0018529 A1 | 1/2011 | Soyama et al. | |
| 2011/0079138 A1 | 4/2011 | Storrie et al. | |
| 2011/0234208 A1 | 9/2011 | Hofmockel et al. | |
| 2011/0240887 A1 | 10/2011 | Christensen et al. | |
| 2011/0247413 A1 | 10/2011 | Vinshtok | |
| 2011/0260717 A1 | 10/2011 | Schleyer | |
| 2013/0249534 A1 | 9/2013 | Matt | |
| 2015/0377658 A1 | 12/2015 | Landis | |

OTHER PUBLICATIONS

International Search Report and Written Opinion issued in application No. PCT/GB2016/051869 dated Sep. 29, 2016, 12 pages.

* cited by examiner

ELECTRICAL PROCESS CONTROL SENSOR ASSEMBLIES

This application is a continuation of U.S. application Ser. No. 15/666,097 filed Aug. 1, 2017, which is a continuation of U.S. application Ser. No. 15/315,135 filed Nov. 30, 2016, both of which are incorporated herein by reference.

The present invention relates to electrical process control sensor assemblies, particularly, but not exclusively, electrical process control sensor assemblies for sensing process or machine parameters.

Conventionally, electrical process control sensor assemblies are provided for sensing process or machine parameters such as proximity/position, temperature, level, pressure, flow and movement of a component or material in a machine or process. For example, proximity sensor assemblies are used to confirm the open or closed position of a valve. Each sensor assembly can comprise a housing, a sensor device within the housing, a mounting, and communication members in the form of wires which extend from the sensor device to a separate connector arrangement such as a junction box which is remote from the sensor assembly. The mounting can comprise a threaded formation formed or located on an external surface of the housing, which engages a corresponding thread of a support, the support comprising, for example, a bracket or machine casing.

In hazardous environments, electrical contacts have to be shielded from exposure to potentially hazardous atmospheres and conventionally this is achieved by "potting" (i.e. encasing) the device and any exposed electrical parts in an insulating filling within the assembly housing. The potting fixes and seals internal components and the communication members to the sensor device and fills the remaining enclosed space within the housing. Hazardous area standards require that the whole assembly has to be capable of withstanding an external impact or an internal ignition of gas, vapour or dust, and containing hot gas or vapour within the housing. The design of the assembly is also required to ensure that any escaping gas/vapour will have cooled whilst exiting along a flame path out to the external atmosphere.

There are a number of problems with conventional arrangements. One problem is that, if the wires are damaged, the whole sensor assembly must be demounted and repaired or replaced. Another problem is that, in screwing the housing into a tapped hole in the support, e.g. a block or machine casing, the wires will rotate with the housing. This means that whenever the sensor assembly is mounted or demounted from the support, to prevent twisting and possible damage the wires have to be disconnected at the separate junction box, which could be hundreds of meters away. A further problem is that, in installation, both the sensor assembly and the separate junction box must both be mounted and interconnected with cables and glands.

According to a first aspect of the present invention, there is provided an electrical process control sensor assembly for sensing a process or machine parameter, the assembly including a sensor body and a head, the body defining a body interior, the assembly including a sensing device at least partially located in the body interior, the head defining a head interior which communicates with the body interior, the assembly including a connector arrangement located in the head interior, the assembly including internal communicating members extending between the sensing device and the connector arrangement, the connector arrangement connecting, in an installed condition, the internal communicating members to external communicating members to permit electrical communication therebetween, the head defining a port through which the external connecting members are located in the installed condition, the assembly including a mounting for mounting the head to the body which is arranged to permit adjustment of the orientation of the head relative to the body.

Possibly, the sensing device is located entirely in the body interior.

Possibly, the connector arrangement is in a fixed association with the body and the sensing device.

Possibly, the mounting is arranged to permit adjustment of the orientation of the head and the port relative to the body and the connector arrangement.

Possibly, the connector arrangement is in a fixed association with the head.

Possibly, the mounting is arranged to permit adjustment of the orientation of the head, the connector arrangement and the port relative to the body.

Possibly, in the installed condition, the external communicating members extend from the connector arrangement to external circuitry.

Possibly, the body extends along a body axis. Possibly, the port is located on a lateral side of the head, relative to the body axis.

Possibly, the body includes a body housing, which may define the body interior.

Possibly, the port is substantially planar, and may have a port axis, which may be normal to the plane of the port. Possibly, the port axis is not aligned nor parallel with the body axis, and may substantially be at 90° to the body axis.

Possibly, the mounting is arranged to permit rotation of the head relative to the body, possibly around a mounting axis.

Possibly, the mounting is arranged to permit rotation of the head and the port relative to the body and the connector arrangement, possibly around a mounting axis, and may permit adjustment of the circumferential position of the port relative to the connector arrangement around the mounting axis. Possibly, the mounting axis is aligned with, and may be coincident with, the body axis.

Possibly, the mounting is arranged to permit rotation of the head, the connector arrangement and the port relative to the body, possibly around a mounting axis.

Possibly, the mounting includes a pair of correspondence surfaces. One correspondence surface may be on the head and the other may be on the body. Possibly, the correspondence surfaces substantially correspond in size and shape to each other and may be substantially in parallel.

Possibly, the correspondence surfaces define a passage therebetween. Possibly, the passage defines an escape path for fluid (e.g. vapour and/or gas, possibly including entrained dust) from the head interior to external ambient atmosphere.

Possibly, the passage includes a plurality of bends.

Possibly, each of the correspondence surfaces includes a plurality of faces.

Possibly, the correspondence surfaces are inclined relative to the body axis. Possibly, the correspondence surfaces are curved.

Possibly, the mounting includes a seal, which may comprise a gasket or O ring, and which may substantially seal the passage to prevent fluid flow therealong. Possibly, the mounting includes a seal formation which defines a seal channel, in which the seal may locate in an assembled condition. Possibly, the seal formation comprises part of one of the faces.

Possibly, the mounting includes a spigot formation, which may comprise part of the head, and which may define a mouth.

Possibly, the mounting includes a socket formation, which may comprise part of the body, and which may define a spigot receiving recess, which may receive the spigot formation in an assembled condition.

Possibly, the mounting includes a stem part of the body, which, in an assembled condition, may extend into the head interior, possibly through the mouth.

Possibly, the mounting includes a retainer, which may retain the head in an assembled condition relative to the body. Possibly, the retainer includes a retaining formation, which defines a retaining channel. Possibly, the retaining formation comprises part of the stem part. Possibly, the retainer includes a retaining member, which may be in the form of a circlip, which may, in the assembled condition, locate in the retaining channel, and may locate substantially against an inside retaining surface of the spigot formation in the assembled condition.

Possibly, the connector arrangement is mounted to the stem part by a connector mounting member.

Possibly, the connector arrangement is mounted to the inside of the head interior by a connector mounting member.

Possibly, the connector arrangement includes a printed circuit board, and the internal communicating members may extend from the device to the printed circuit board. Possibly, the assembly includes one or more fixing members which may extend between the printed circuit board and the connector mounting member and may provide earth continuity therebetween. Possibly, the connector arrangement includes connectors which may be mounted to the printed circuit board and may, in the installed condition, receive and retain the external communicating members.

Possibly, the head includes a port formation, which may define the port.

Possibly, the head includes a head housing, which may define an access aperture. Possibly, the head includes a cover, which may be movable between a closed condition, in which the cover closes the aperture, and an open condition, in which the cover permits access to the connector arrangement through the aperture. Possibly, the head includes a seal for sealing between the cover and the head housing.

Possibly, the assembly is for sensing process or machine parameters including any of proximity, position, temperature, level, pressure, flow or movement of a component or material in a machine or process. Possibly, the sensor device is a device for sensing proximity, position, level, temperature, pressure or movement.

Possibly, the process or machine parameter is the proximity of an object. Possibly, the sensing device is a proximity sensor for sensing the proximity of an object. Possibly, the device comprises a magnet proximity sensor.

Possibly, the magnetic proximity sensor includes: a primary magnet, a primary magnet holder, a flux sleeve, a flux sleeve holder, a centre housing moulding containing a centre magnet located therein, an insulation sleeve, a slider moulding with a shaft extending therefrom and a bias slider magnet located therein, a contact carrier, a washer, a retaining plate, a screw, a contact moulding with first, second and third contact pins extending therefrom, and a seal plug.

Possibly, the device comprises a reed assembly.

Possibly, the sensing device is a flow sensor for sensing the flow of gas or liquid through a pipe or vessel. Possibly, the sensing device is a horizontal level sensor for sensing the level of a liquid in a tank. Possibly, the sensing device is a vertical level sensor for sensing the level of a liquid in a tank. Possibly, the sensing device is a vibration sensor for sensing the movement of a body, for instance, acceleration, velocity or displacement of the body. Possibly, the sensing device is a pressure sensor for sensing the pressure of a gas or liquid. Possibly, the sensing device is a temperature sensor for sensing the temperature of a gas, liquid, or solid.

Possibly, the head defines a plurality of ports through which the external communicating members are located in the installed condition. Possibly, the head defines two ports on opposite sides of the head. Possibly, the head defines up to four equally spaced ports. Possibly, the ratio of connector arrangements to ports is 1:1, 1:2, 1:3 or 1:4.

Possibly, the internal communicating members are in the form of wires, spring contacts or brush contacts.

According to a second aspect of the present invention, there is provided a method of sensing a process or machine parameter, the method including providing an electrical process control sensor assembly, the assembly including a sensor body and a head, the body defining a body interior, the assembly including a sensing device at least partially located in the body interior, the head defining a head interior which communicates with the body interior, the assembly including a connector arrangement located in the head interior, the assembly including internal communicating members extending between the sensing device and the connector arrangement, the connector arrangement connecting, in an installed condition, the internal communicating members to external communicating members to permit electrical communication therebetween, the head defining a port through which the external connecting members are located in the installed condition, the assembly including a mounting for mounting the head to the body which is arranged to permit adjustment of the orientation of the head relative to the body.

Possibly, the assembly includes any of the features described in any of the preceding statements or following description. Possibly, the method includes any of the steps described in any of the preceding statements or following description.

Embodiments of the present invention will now be described, by way of example only, and with reference to the accompanying drawings, in which.

Figure 1:
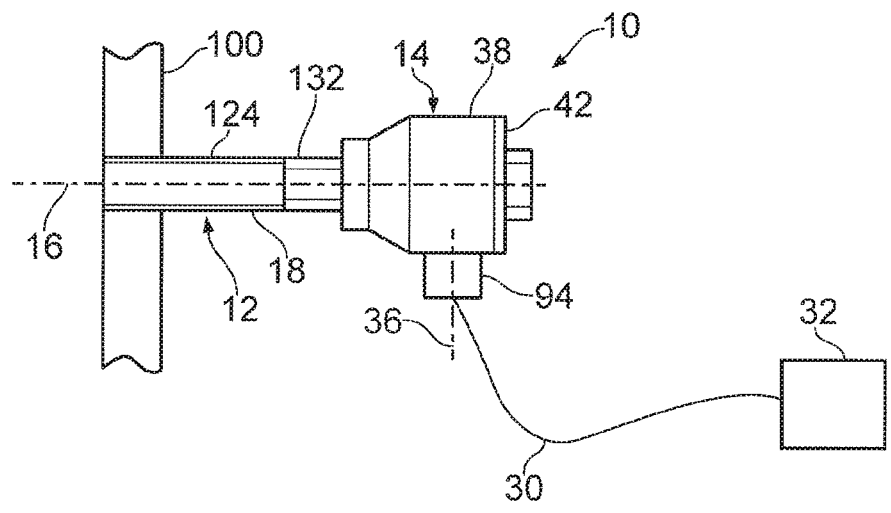
FIG. 1 is a schematic side view of a first sensor assembly in use which includes a magnetic proximity sensor.
Figure 2:
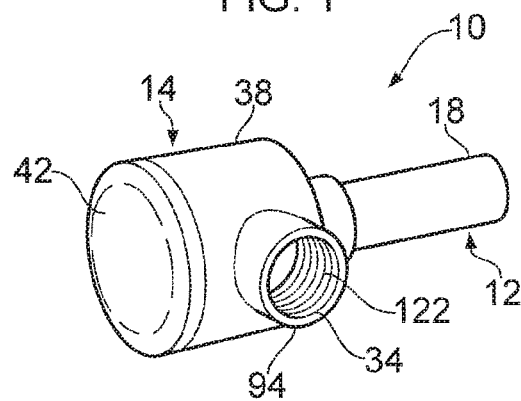
FIG. 2 is a perspective view of the assembly of FIG. 1.
Figure 3:
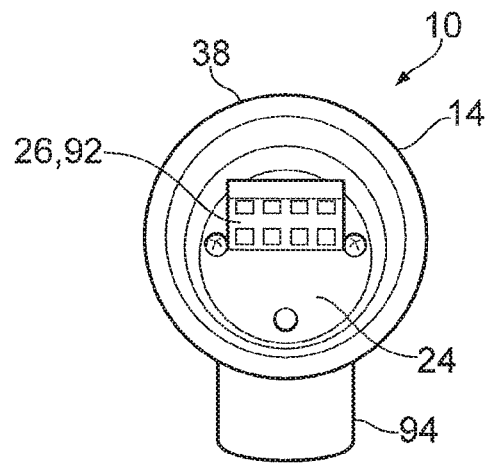
FIG. 3 is a perspective view from above of the first sensor assembly, partially disassembled, with a cover removed, looking into a head interior.

FIGS. 1 to 4 show a first electrical process control sensor assembly 10 for sensing a process or machine parameter such as the proximity of an object (not shown). The assembly 10 includes a sensor body 12 and a head 14. The body 12 extends along a body axis 16 and defines a body interior 20.

The assembly 10 includes a sensing device 22 located in the body interior 20.

The head 14 defines a head interior 24 which communicates with the body interior 20.

The assembly 10 includes a connector arrangement 26 located in the head interior 24 and in a fixed association with the body 12 and the sensing device 22. The assembly 10 includes internal communicating members 28 extending between the sensing device 22 and the connector arrangement 26. The connector arrangement 26 connects, in an installed condition, the internal communicating members 28 to external communicating members 30 to permit electrical communication therebetween.

The head 14 defines a port 34 through which the external connecting members 30 are located in the installed condition.

The assembly 10 includes a mounting 48 for mounting the head 14 to the body 12 which is arranged to permit adjustment of the orientation of the head 14 and the port 34 relative to the body 12 and the connector arrangement 26.

In the installed condition, the external communicating members 30 extend from the connector arrangement 26 to external circuitry 32.

In some examples of the disclosure, the sensing device 22 could be a proximity sensor and could comprise a magnet assembly or a reed assembly, for sensing the proximity of an object.

Figure 4:
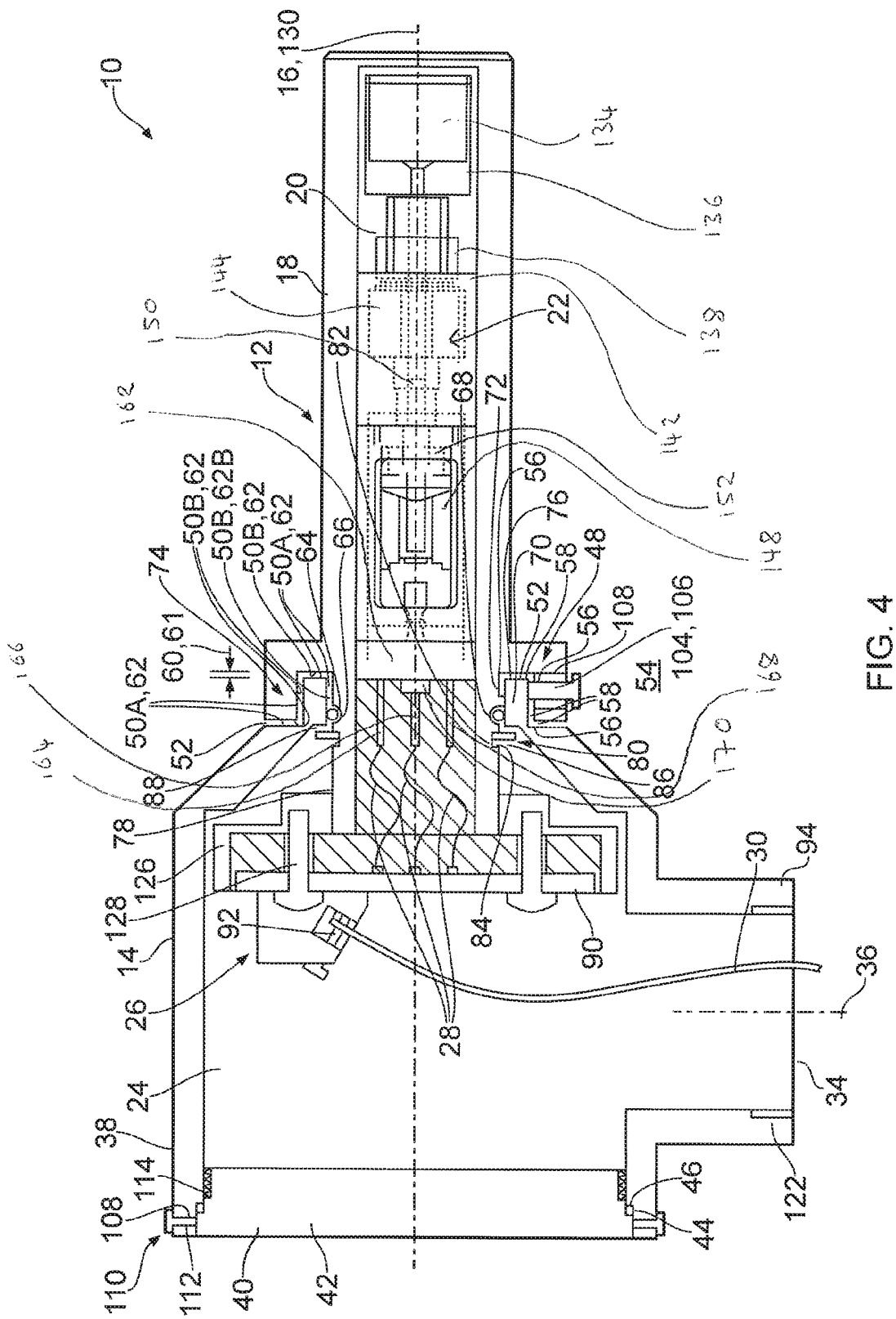
FIG. 4 is a longitudinal side cross-sectional view of the first sensor assembly.

In the example of the disclosure shown in FIG. 4 the sensing device 22 is a proximity sensor 22 with a magnetic assembly, known as a magnetic proximity sensor.

Figure 5:
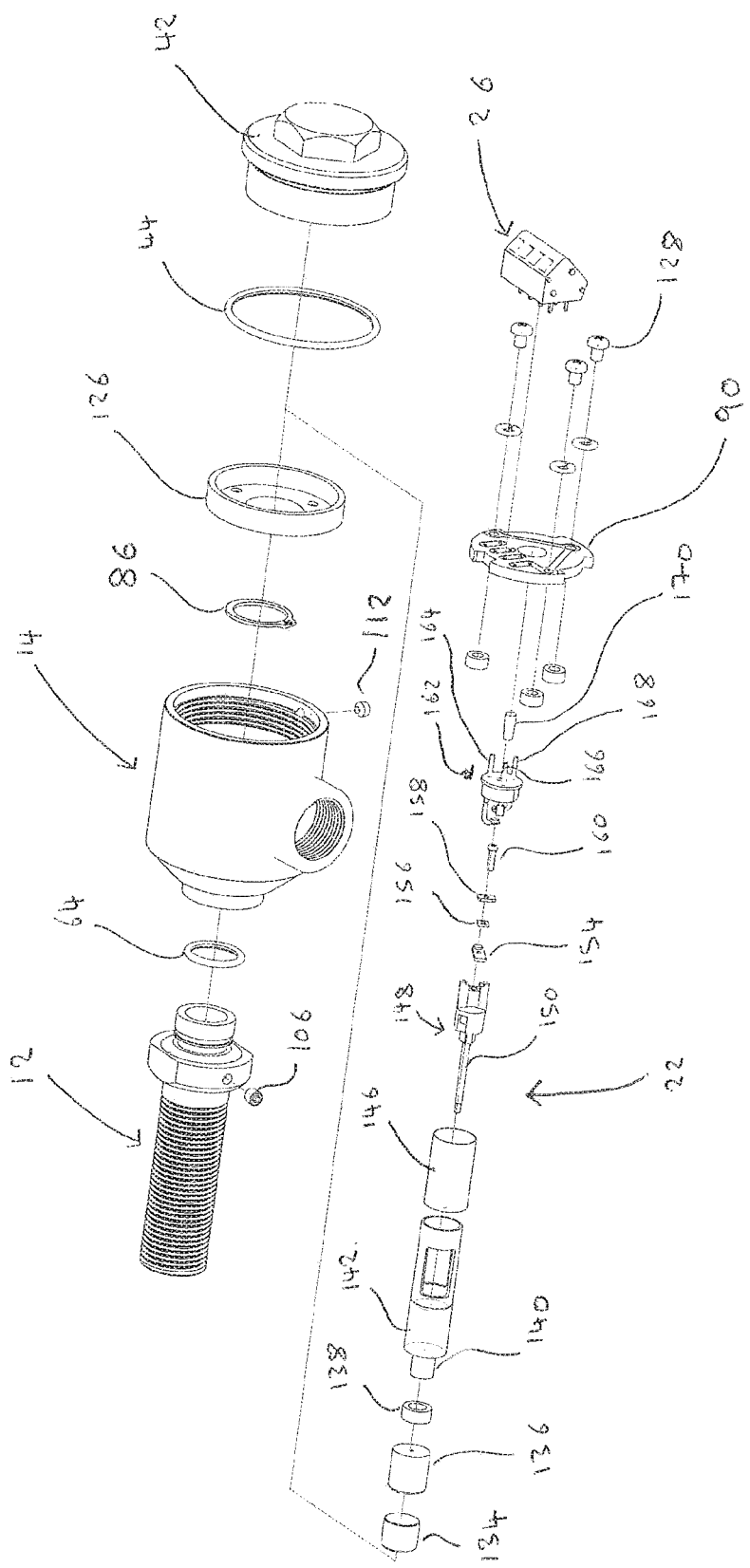
FIG. 5 is an exploded view of a part of the first sensor assembly.

An exploded view of the magnetic proximity sensor 22 is shown in FIG. 5. With reference to FIGS. 4 and 5, the magnetic proximity sensor 22 includes: a primary magnet 134, a primary magnet holder 136, a flux sleeve 138, a flux sleeve holder 140, a centre housing moulding 142 containing a centre magnet 144 (not shown) located therein, an insulation sleeve 146, a slider moulding 148 with a shaft 150 extending therefrom and a bias slider magnet 152 (not shown) located therein, a contact carrier 154, a washer 156, a retaining plate 158, a screw 160, a contact moulding 162 with first 164, second 166 and third 168 contact pins extending therefrom, and a seal plug 170.

In some examples of the disclosure, the magnetic proximity sensor may be provided without a flux sleeve.

As shown in FIG. 4, the magnetic proximity sensor 22 is located entirely within the body interior 20.

The body 12 extends along a body axis 16.

The head 14 includes a port formation 94, which defines the port 34. The port 34 is substantially planar, and has a port axis 36, which in the example shown is normal to the plane of the port 34. In the example shown in FIGS. 1 to 4, the port axis 36 is not aligned with nor in parallel to the body axis 16 and is substantially at 90° to the body axis 16. The port 34 is located on a lateral side of the head 14, relative to the body axis 16.

The mounting 48 is arranged to permit rotation of the head 14 and the port 36 relative to the body 12 and the connector arrangement 26 around a mounting axis 130, which in this example, is aligned with, and is coincident with, the body axis 16. The mounting 48 permits adjustment of the circumferential position of the port 34 relative to the connector arrangement 26 around the mounting axis 130.

The head 14 includes a head housing 38, which defines an access aperture 40. The head 14 includes a cover 42, which is movable between a closed condition, in which the cover 42 closes the aperture 40, and an open condition, in which the cover 42 permits access to the connector arrangement 26 through the aperture 40.

The head 14 includes a seal 44 for sealing between the cover 42 and the head housing 38. The cover 42 and/or the head housing 38 could define a seal recess 46 in which the seal 44 is located in an assembled condition. The cover 42 and the head housing 38 could include corresponding mutually engageable threaded formations 114.

The head 14 includes a cover lock 110 for securing the cover 42 to the housing 38. The cover lock 110 includes a lock member 112, which could be in the form of a grub screw, which, in the assembled condition, extends through a threaded cover lock aperture 114 defined by the head housing 38 to locate against the cover 42 to prevent the cover 42 unintentionally moving from the assembled condition, for example, by vibration.

The mounting 48 includes a pair of correspondence surfaces 50. One correspondence surface 50A is on the head 14 and the other correspondence surface 50B is on the body 12. The correspondence surfaces 50 substantially correspond in size and shape to each other and are substantially in parallel.

The correspondence surfaces 50 define a passage 52 therebetween. The passage 52 defines a fluid path for escaping fluid (e.g. vapour and/or gas, which could include entrained dust) from the head interior 24 to external ambient atmosphere 54.

In the example of the disclosure shown in FIG. 4, the passage 52 includes a plurality of bends 56. The passage 52 includes three bends 56. Each bend 56 is of substantially 90°. The passage 52 includes straight parts 58 when viewed in longitudinal cross section (i.e. in cross section taken along the length of the assembly 10) as shown in FIG. 4. The passage 52 has a height dimension 60, which provides a gap 61 between the correspondence surfaces 50. Each of the correspondence surfaces 50 includes a plurality of faces 62, which are located between the bends 56.

The mounting 48 includes a spigot formation 70, which comprises part of the head 14, and defines a mouth 72. The head correspondence surfaces 50A comprise surfaces of the spigot formation 70.

The mounting 48 includes a socket formation 74, which comprises part of the body 12, and which defines a spigot receiving recess 76, which receives the spigot formation 70 in the assembled condition. The body correspondence surfaces 50B comprise surfaces of the socket formation 74.

The mounting 48 includes a stem part 78 of the body 12, which in the assembled condition extends into the head interior 24, through the mouth 72.

The mounting 48 includes a passage seal 64, which could comprise a gasket or O ring, and which substantially seals the passage 52 to prevent fluid flow therealong. The mounting 48 includes a passage seal formation 66 which defines a seal channel 68, in which the seal 64 is located in the assembled condition. The seal formation 66 comprises part of one of the faces 62. In the example shown, the seal formation 66 comprises part of the innermost face 62B of the body correspondence surface 50B which is also a surface of the stem part 78 of the body 12.

The mounting 48 includes a retainer 80, which retains the head 14 in an assembled condition relative to the body 12. The retainer 80 includes a retaining formation 82 which defines a retaining channel 84. The retaining formation 82 comprises part of the stem part 78. The retainer 80 includes a retaining member 86, which could be in the form of a circlip, which locates in the retaining channel 84 substantially against an inside retaining surface 88 of the spigot formation 70 in the assembled condition. In the assembled condition, the retaining formation 82 prevents movement of the spigot formation 70 out of the spigot receiving recess 76 and thus retains the head 14 in engagement with the body 12.

The connector arrangement 26 is mounted to an end of the stem part 78 of the body 12 by a connector mounting member 126, which provides the fixed association between the connector arrangement 26, the body 12 and the sensing device 22. The connector arrangement 26 includes a printed circuit board 90, which is fixed to the connector mounting member 126 by fixing members 128. The fixing members 128 provide earth continuity between the connector mounting member 126 and the printed circuit board 90.

The internal communicating members 28 extend from the sensing device 22 to the printed circuit board 90. The connector arrangement 26 includes connectors 92 (for example, clamp connectors) which are mounted to the printed circuit board 90 and in use, in an installed condition, receive and retain the external communicating members 30.

The assembly 10 includes a head lock 104 for securing the head 14 in a fixed circumferential position relative to the body 12. The head lock 104 includes a lock member 106, which could be in the form of a grub screw, which, in the assembled condition, extends through a threaded head lock aperture 108 defined by the head housing 38 to locate against the stem part 78 to prevent the head 14 moving relative to the body 12.

The port formation 94 includes a threaded formation 122 engageable in the assembled condition with a corresponding threaded formation of a cable gland (not shown).

The body 12 includes a body housing 18, which defines the body interior 20. The body housing 18 includes a threaded formation 124 on an external surface for mounting to a support 100. The body housing 18 includes a pair of oppositely directed, parallel flat surface areas 132.

In one example, the body housing 18, the head housing 38 and the cover 42 are formed of a metal such as stainless steel. The correspondence surfaces 50 could be formed of a self-lubricating bush/bearing material.

To enable relative movement between the head 14 and the body 12, there must be some clearance between the correspondence surfaces 50. To meet the requirements for hazardous environments, the assembly 10 must be able to withstand an internal ignition of gas, vapour or dust, and contain hot gas or vapour within the assembly 10, or allow it to cool before exiting into a potentially explosive external atmosphere.

In one example, the applicant has found that these requirements can be met by providing a passage 52 with a gap 61 of no more than 0.02 mm and at least one straight part 58 with a length of at least 6.35 mm.

In another example, the applicant has found that these requirements can be met by providing a passage 52 with a gap 61 of no more than 0.1 mm and at least one straight part 58 with a length of at least 6.00 mm. Thus, one of the faces 62 of the correspondence surfaces 50 has a straight length in longitudinal cross section of at least 6 mm.

In use, and referring to FIG. 1, the sensor assembly 10 is threadably mounted to the support 100 by a screwing action, using a spanner in engagement with the flat surface areas 132 to prevent damage to the head lock 104. The cover 42 is removed from the body housing 18. The head 14 is rotated relative to the body 12 to a convenient position and locked with the head lock 104. The external communicating members 30 are located through the cable gland and the port 34 and connected to the connectors 92. The gland can then be tightened to seal the port 34 and the cover 42 located onto the head housing 38 and locked with the cover lock 110.

Advantageously, the sensor assembly 10 permits disconnection and reconnection of the external communicating members 30 without requiring removal of the sensor body 12 from the support 100. The orientation of the head 14 and the port 34 can be adjusted relative to the body 12 and the connector arrangement 26. Thus the orientation of the head 14 and the port 34 can be adjusted to optimise the cable entry position into the head 14 for a particular installation. The assembly 10 can be mounted without disconnection of the external communicating members 30 from the external circuitry 32.

Advantageously, the mounting 48 provides a fluid escape path defined by the passage 72 which permits use of the assembly 10 in hazardous environments.

FIGS. 6 to 11 respectively show second, third, fourth, fifth, sixth and seventh electrical process control sensor assemblies 200, 300, 400, 500, 600, 700 for sensing a process or machine parameter.

Many features of the second, third, fourth, fifth, sixth and seventh electrical process control sensor assemblies 200, 300, 400, 500, 600, 700 are similar to those previously described, and where features are the same or similar the same reference numerals have been used and these features will not be described again for the sake of brevity. In fact, the only differences relative to the first electrical process control sensor assembly are as follows.

Figure 6:
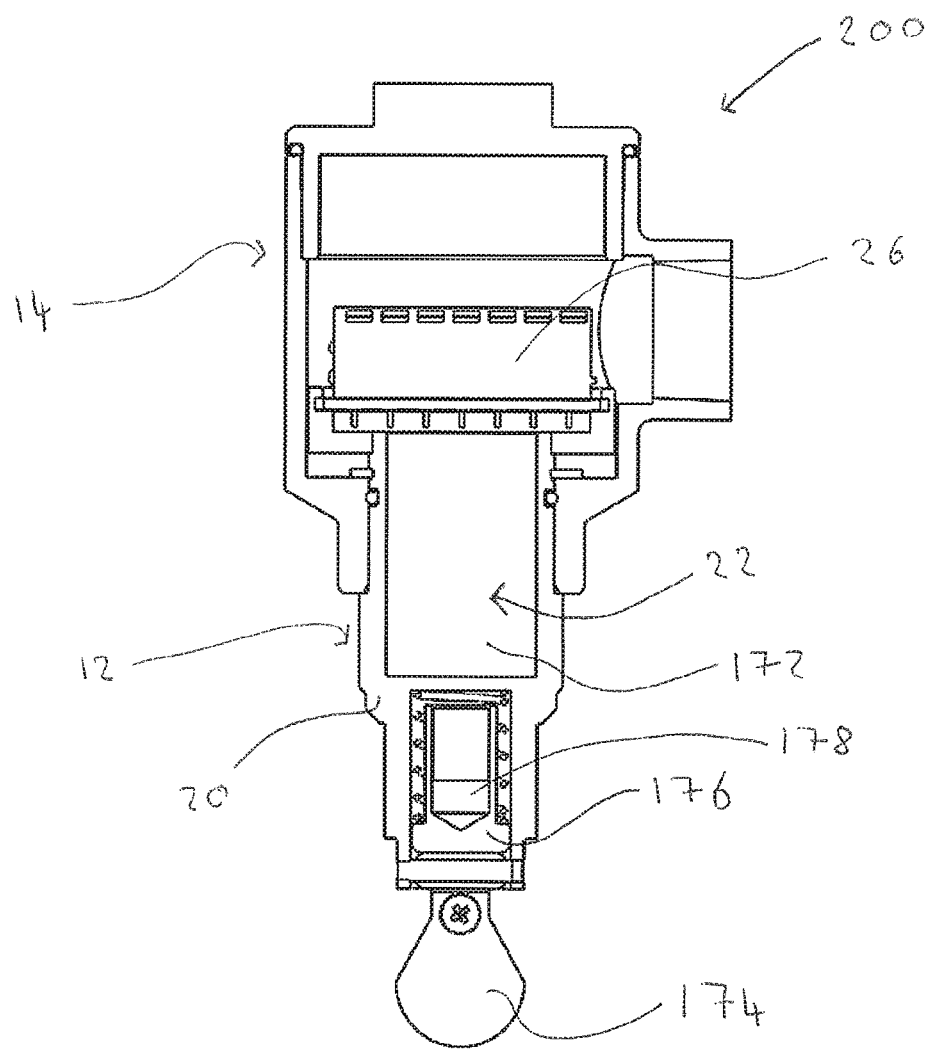
FIG. 6 is a longitudinal side cross-sectional view of a second sensor assembly which includes a flow sensor.

In the second electrical process control sensor assembly 200 shown in FIG. 6, the sensing device 22 is a flow sensor. The flow sensor 22 is used to sense the flow of fluid (gas or liquid) through a pipe or vessel. The flow sensor 22 includes a sensor element 172 and an actuator 174 in the form of a paddle coupled to the sensor element 172 by a detection means 176. A part of the actuator 174 extends from the body interior 20. The sensing device 22 is therefore partially located in the body interior 20. In some examples of the disclosure, the detection means 176 includes a spring and piston arrangement 178.

Figure 7:
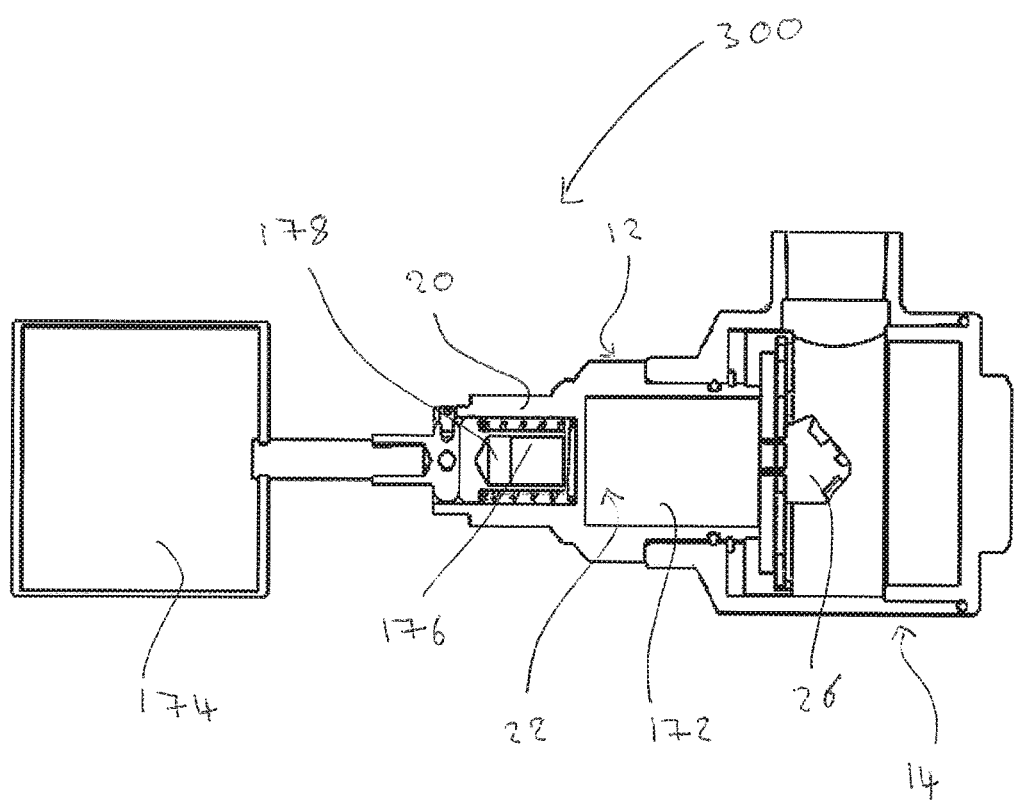
FIG. 7 is a longitudinal side cross-sectional view of a third sensor assembly which includes a horizontal level sensor.

In the third electrical process control sensor assembly 300 shown in FIG. 7, the sensing device 22 is a horizontal level sensor. The horizontal level sensor 22 is used to sense the level of a fluid in a tank. The horizontal level sensor 22 includes a sensor element 172 and an actuator 174 in the form of a float coupled to the sensor element 172 by a detection means 176. A part of the actuator 174 extends from the body interior 20. The sensing device 22 is therefore partially located in the body interior 20. In some examples of the disclosure, the detection means 176 includes a spring and piston arrangement 178.

Figure 8:
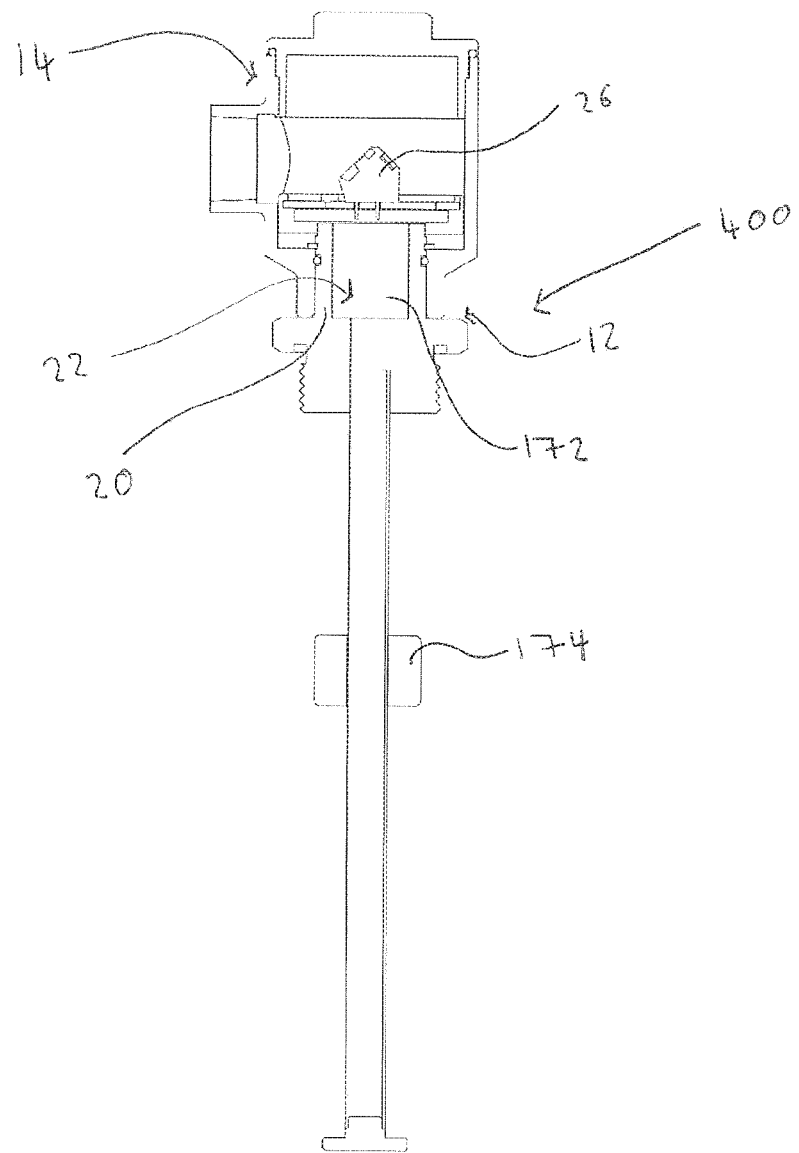
FIG. 8 is a longitudinal side cross-sectional view of a fourth sensor assembly which includes a vertical level sensor.

In the fourth electrical process control sensor assembly 400 shown in FIG. 8, the sensing device 22 is a vertical level sensor. The vertical level sensor 22 is used to sense the level of a fluid in a tank. The vertical level sensor 22 includes a sensor element 172 and an actuator 174 in the form of a float. A part of the actuator 174 extends from the body interior 20. The sensing device 22 is therefore partially located in the body interior 20.

Figure 9:
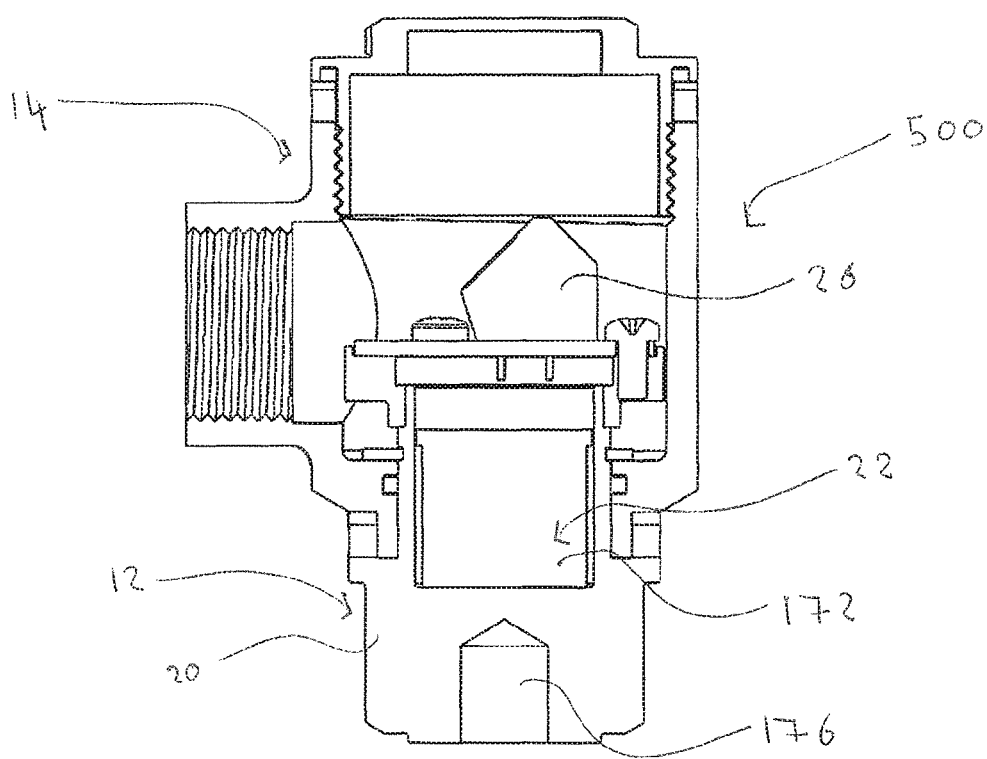
FIG. 9 is a longitudinal side cross-sectional view of a fifth sensor assembly which includes a vibration sensor.

In the fifth electrical process control sensor assembly 500 shown in FIG. 9, the sensing device 22 is a vibration sensor. The vibration sensor 22 is used to sense the movement of a body, for example acceleration, velocity or displacement of the body. The vibration sensor 22 includes a sensor element 172 and a detection means 176 in the form of an opening for receiving a stud (not shown), as would be understood by a person skilled in the art.

Figure 10:
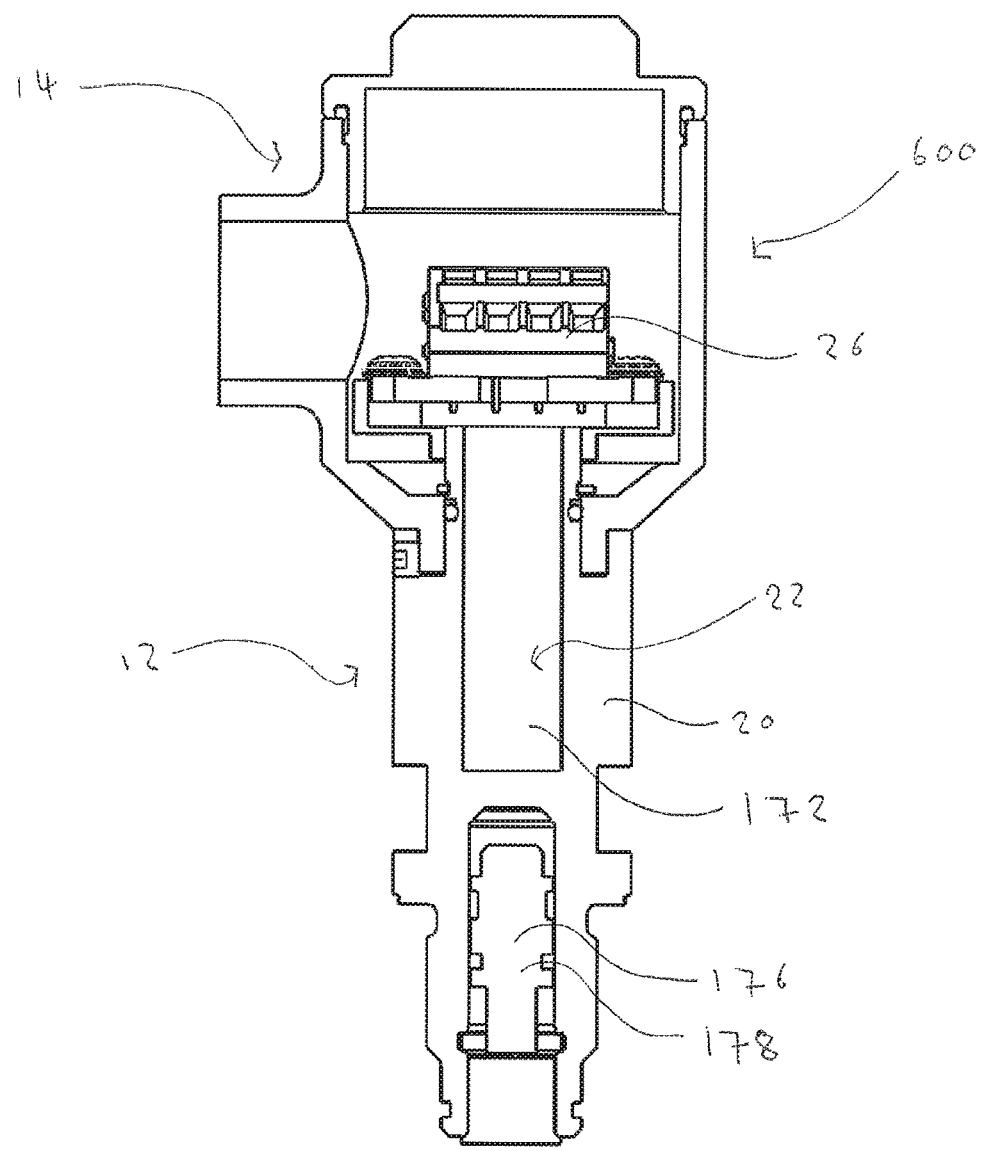
FIG. 10 is a longitudinal side cross-sectional view of a sixth sensor assembly which includes a pressure sensor.

In the sixth electrical process control sensor assembly 600 shown in FIG. 10, the sensing device 22 is a pressure sensor. The pressure sensor 22 is used to sense the pressure of fluid (gas or liquid). The pressure sensor 22 includes a sensor element 172 and a detection means 176 in the form of a spring and piston arrangement 178, as would be understood by a person skilled in the art.

Figure 11:
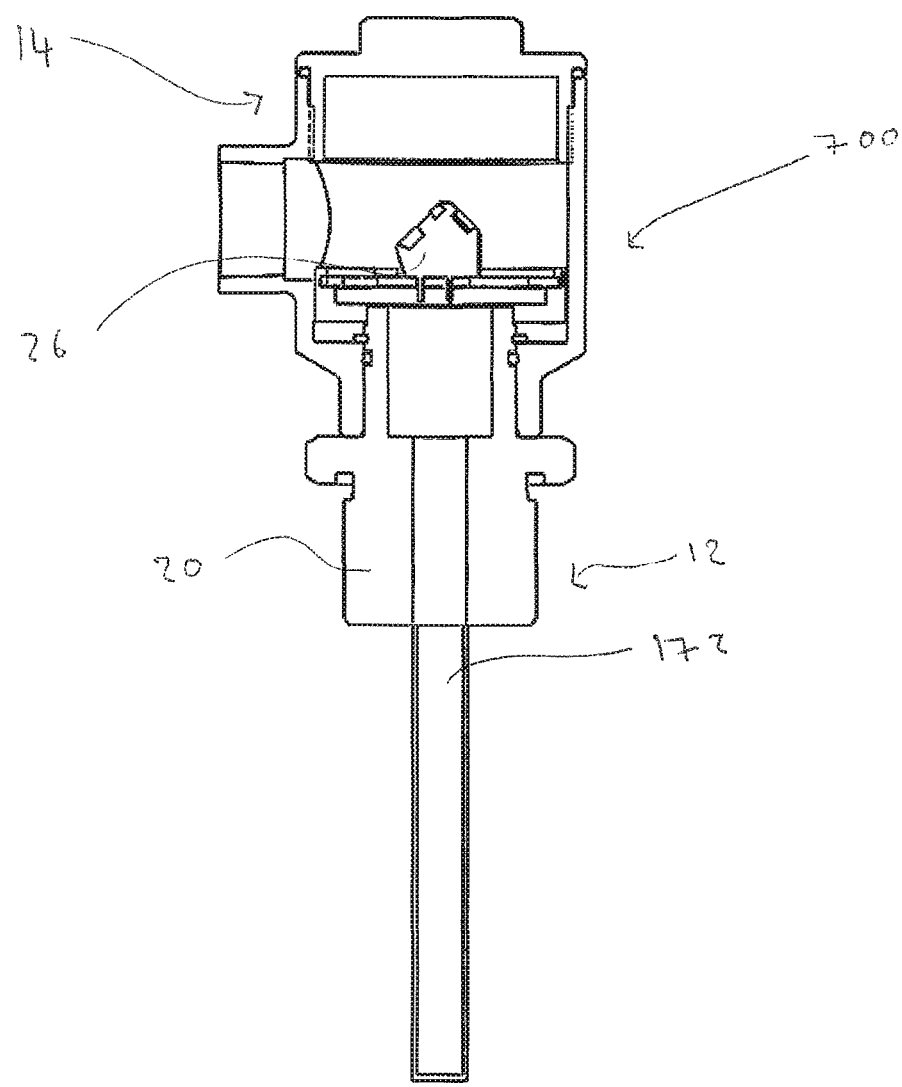
FIG. 11 is a longitudinal side cross-sectional view of a seventh sensor assembly which includes a temperature sensor.

In the seventh electrical process control sensor assembly 700 shown in FIG. 11, the sensing device 22 is a temperature sensor. The temperature sensor 22 is used to sense the temperature of a fluid (gas or liquid), or solid. The temperature sensor 22 includes a sensor element 172 which extends from the body interior 20. The sensing device 22 is therefore partially located in the body interior 20.

Figure 12:
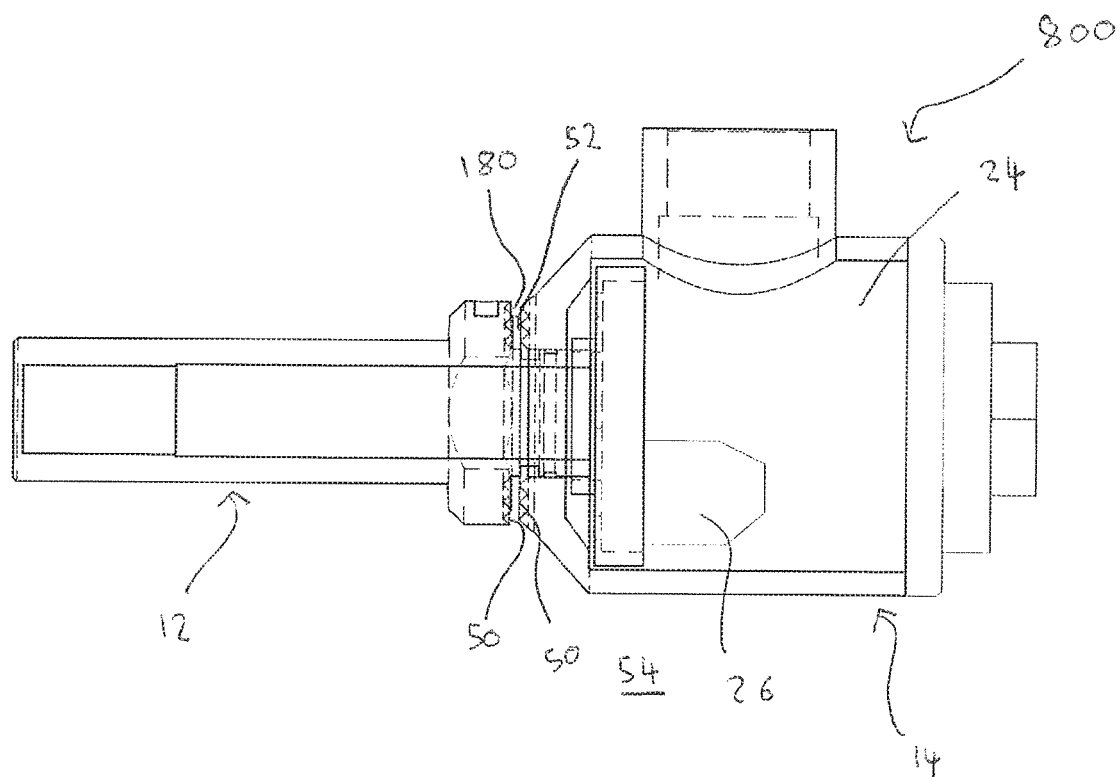
FIG. 12 is a longitudinal side cross-sectional view of an eighth sensor assembly including a first alternative fluid path for escaping fluid.
Figure 13:
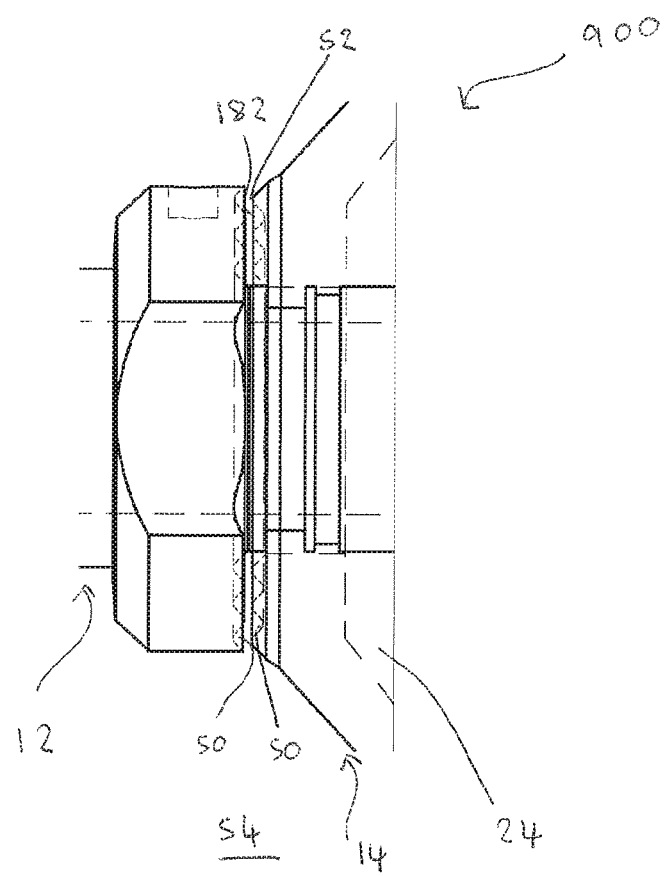
FIG. 13 is a longitudinal side cross-sectional view of a ninth sensor assembly including a second alternative fluid path for escaping fluid.

FIGS. 12 and 13 respectively show eighth and ninth electrical process control sensor assemblies 800, 900 for sensing a process or machine parameter.

Many features of the eighth and ninth electrical process control sensor assemblies 800, 900 are similar to those previously described, and where features are the same or similar the same reference numerals have been used and these features will not be described again for the sake of brevity. In fact, the only differences relative to the electrical process control sensor assemblies already described above are as follows.

In the eighth electrical process control sensor assembly 800 shown in FIG. 12, a serrated fluid path 180 is provided in which the correspondence surfaces 50 are inclined relative to the body axis. The correspondence surfaces 50 substantially correspond in size and shape to each other and are substantially in parallel.

The correspondence surfaces 50 define a passage 52 therebetween. The passage 52 defines a fluid path for escaping fluid (e.g. vapour and/or gas, which could include entrained dust) from the head interior 24 to external ambient atmosphere 54.

In one example, the passage 52 has a height dimension of no more than 0.02 mm and an overall length of at least 6.35 mm. In another example, the passage 52 has a height dimension of no more than 0.01 mm and an overall length of at least 6.00 mm.

In the ninth electrical process control sensor assembly 900 shown in FIG. 13, a sinusoidal fluid path 182 is provided in which the correspondence surfaces 50 are curved. The correspondence surfaces 50 substantially correspond in size and shape to each other and are substantially in parallel.

The correspondence surfaces 50 define a passage 52 therebetween. The passage 52 defines a fluid path for escaping fluid (e.g. vapour and/or gas, which could include entrained dust) from the head interior 24 to external ambient atmosphere 54.

In one example, the passage 52 has a height dimension of no more than 0.02 mm and an overall length of at least 6.35 mm. In another example, the passage 52 has a height dimension of no more than 0.01 mm and an overall length of at least 6.00 mm.

Figure 14:
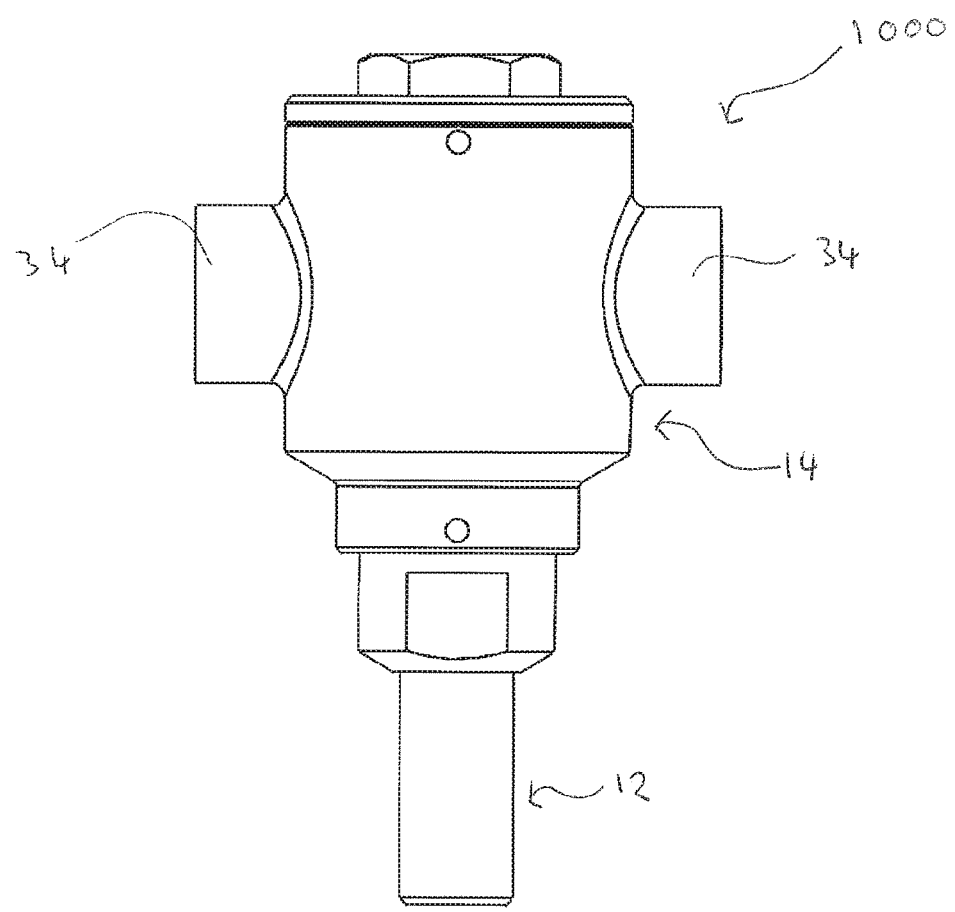
FIG. 14 is a schematic side view of a tenth sensor assembly with a head with two ports.

FIG. 14 shows a tenth electrical process control sensor assembly 1000 for sensing a process or machine parameter.

Many features of the tenth electrical process control sensor assembly 1000 are similar to those previously described, and where features are the same or similar the same reference numerals have been used and these features will not be described again for the sake of brevity. In fact, the only differences relative to the electrical process control sensor assemblies already described above are as follows.

In the example shown in FIG. 14 the head 14 defines two ports 34 on opposite sides of the head. In other examples of the disclosure the head 14 defines up to four equally spaced ports 34. The ratio of connector arrangements 26 to ports 34 could be 1:1, 1:2, 1:3 or 1:4.

Figure 15:
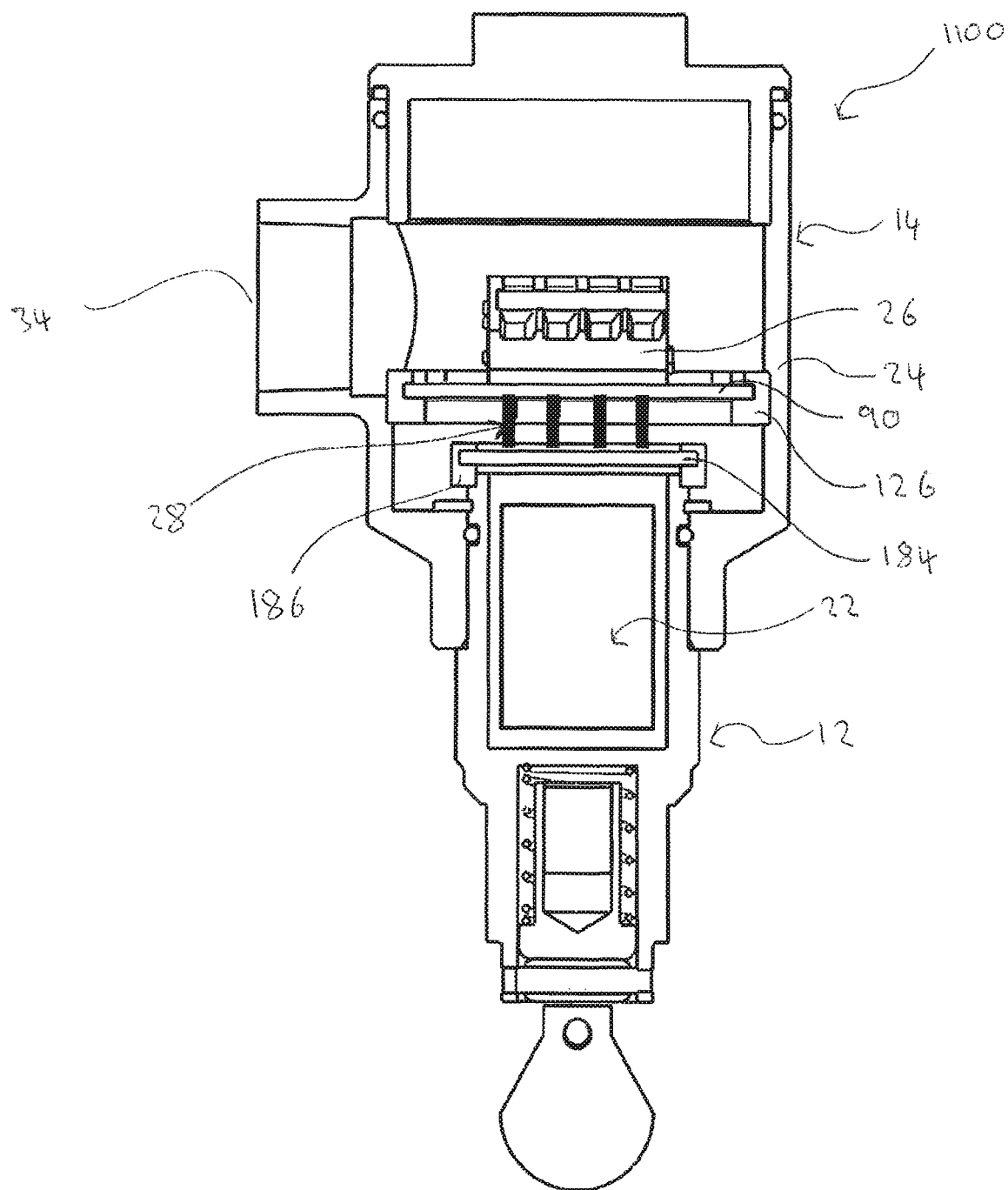
FIG. 15 is a longitudinal side cross-sectional view of an eleventh sensor assembly.
Figure 16:
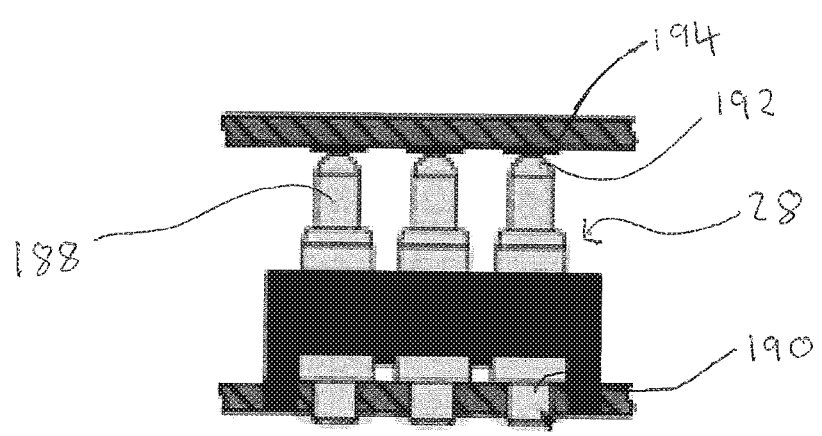
FIG. 16 is a schematic side view of a part of the eleventh sensor assembly.

FIGS. 15 and 16 show an eleventh electrical process control sensor assembly 1100 for sensing a process or machine parameter.

Many features of the eleventh electrical process control sensor assembly 1100 are similar to those previously described, and where features are the same or similar the same reference numerals have been used and these features will not be described again for the sake of brevity. In fact, the only differences relative to the electrical process control sensor assemblies already described above are as follows.

The connector arrangement 26 of the eleventh sensor assembly 1100 is in a fixed association with the head 14. The assembly 1100 includes a mounting 48 for mounting the head 14 to the body 12 which is arranged to permit adjustment of the orientation of the head 14, the port 34 and the connector arrangement 26 relative to the body 12 and the sensing device 22.

The connector arrangement 26 includes a first printed circuit board 90, which is fixed to a connector mounting member 126. The connector mounting member 126 is mounted to the inside of the head interior 24 by a threaded connection, which provides the fixed association between the connector arrangement 26 and the head 14.

The assembly 1100 includes a second printed circuit board 184, which is fixed to a mounting member 186. The mounting member 186 is fixed to the top side of the body 12 by a threaded connection. The second printed circuit board 184 is connected to the sensing device 22 by internal communicating wires (not shown).

The assembly 1100 includes internal communicating members 28 extending between the first and second printed circuit boards 90, 184. The internal communicating members 28 therefore connect the sensing device 22 with the connector arrangement 26.

In the example of the disclosure shown in FIG. 16 the internal communicating members 28 are a plurality of spring contacts 188. In other examples of the disclosure a single spring contact 188 may be provided. With respect to each spring contact 188, a first part 190 of the spring contact 188 is fixedly connected to the second printed circuit board 184, and a second part 192 of the spring contact 188 is urged against a copper track 194 laid on the underside of the first printed circuit board 90 to thereby make an electrical contact between the sensing device 22 and the connector arrangement 26.

Adjustment of the orientation of the head 14, the port 34 and the connector arrangement 26 relative to the body 12 and the sensing device 22 by rotation causes the second part 192 of the spring contact 188 to move along the copper track 194 laid on the underside of the first printed circuit board 90 such that electrical contact between the sensing device 22 and the connector arrangement 26 is maintained in any orientation of the head 14 relative to the body 12.

The resistance between the spring contacts 188 and the copper track 194 is sufficient to maintain electrical contact during rotation of the head 14 relative to the body 12 without having a noticeable effect on the amount of force required to rotate the head 14 relative to the body 12.

A further advantage of the assembly 1100 is that the orientation of the connector arrangement 26 relative to the port 34 is fixed in an optimum position to allow, in an installed condition, external communicating members 30 to extend through the port 34 and connect to the connector arrangement 26. Accordingly, the relative positions of the connector arrangement 26 and the port 34 remain constant throughout adjustment of the orientation of the head 14 relative to the body 12.

In other examples of the disclosure, the internal communicating members 28 may be in the form of brush contacts (not shown) which would extend from the first printed circuit board 90 and make contact with copper tracks 194 laid on the upper side of the second printed circuit board 184.

The spring and brush contacts allow unlimited rotation of the head 14 about the body 12.

Alternatively, the internal communicating members 28 extending between the first and second printed circuit boards 90, 184 may be in the form of wires of a sufficient length to allow the head 14 to be rotated about the body 12, for instance, by at least 360 degrees. The degree of rotation permitted may be controlled by a stop (not shown) being provided on the head 14 or body 12 to prevent rotation by more than 360 degrees. Various other modifications could be made without departing from the scope of the invention. The assembly and the various components thereof could be of any suitable size and shape, and could be formed of any suitable material (within the scope of the specific definitions herein).

There are thus provided sensor assemblies with a number of advantages over conventional arrangements.

Features described in the preceding description may be used in combinations other than the combinations explicitly described.

Although functions have been described with reference to certain features, those functions may be performable by other features whether described or not.

Although features have been described with reference to certain examples, those features may also be present in other examples whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An electrical process control sensor assembly for sensing a process or machine parameter, the assembly including a sensor body and a head, the body defining a body interior, the assembly including a sensing device at least partially located in the body interior, the head defining a head interior which communicates with the body interior, the assembly including a connector arrangement located in the head interior, the assembly including internal communicating members extending between the sensing device and the connector arrangement, the connector arrangement connecting, in an installed condition, the internal communicating members to external communicating members to permit electrical communication therebetween, the head defining a port through which the external connecting members are located in the installed condition, the assembly including a mounting for mounting the head to the body, the mounting being arranged to permit rotation of the head relative to the body around a position on a mounting axis.

2. An assembly according to claim 1, in which the body extends along a body axis and the mounting axis is aligned with the body axis, wherein the mounting is arranged such that rotation of the head relative to the body around the position on the mounting axis is permitted without linear movement of the head or the body along the mounting axis.

3. An assembly according to claim 1, in which the mounting is arranged to permit continuous rotation of the head relative to the body around the position on the mounting axis.

4. An assembly according to claim 1, in which the port is located on a lateral side of the head, relative to the body axis, wherein the port is substantially planar, and has a port axis, which is normal to the plane of the port.

5. An assembly according to claim 4, in which the port axis is substantially at 90° to the body axis.

6. An assembly according to claim 1, in which the head defines a plurality of ports through which the external communicating members are located in the installed condition.

7. An assembly according to claim 1, in which the connector arrangement is in a fixed association with the body and the sensing device, and the mounting is arranged to permit rotation of the head and the port relative to the body and the connector arrangement around the position on the mounting axis.

8. An assembly according to claim 1, in which the connector arrangement is in a fixed association with the head, and the mounting is arranged to permit rotation of the head, the connector arrangement and the port relative to the body around the position on the mounting axis.

9. An assembly according to claim 1, in which the mounting includes a spigot formation and a socket formation, the socket formation defining a spigot receiving recess, which receives the spigot formation in an assembled condition, wherein the spigot formation comprises part of the head and the socket formation comprises part of the body.

10. An assembly according to claim 1, in which the mounting includes a retainer, which retains the head in an assembled condition relative to the body.

11. An assembly according to claim 10, in which the retainer includes a retaining formation, which defines a retaining channel.

12. An assembly according to claim 10, in which the retainer includes a retaining member, which, in the assembled condition, locates in the retaining channel.

13. An assembly according to claim 1, in which the assembly is for sensing process or machine parameters including any of proximity, position, temperature, level, flow, pressure or movement of a component or material in a machine or process.

14. An assembly according to claim 1, in which the sensor is a magnetic proximity sensor.

15. A method of sensing a process or machine parameter, the method including providing an electrical process control sensor assembly for sensing a process or machine parameter, the assembly including a sensor body and a head, the body defining a body interior, the assembly including a sensing device at least partially located in the body interior, the head defining a head interior which communicates with the body interior, the assembly including a connector arrangement located in the head interior, the assembly including internal communicating members extending between the sensing device and the connector arrangement, the connector arrangement connecting, in an installed condition, the internal communicating members to external communicating members to permit electrical communication therebetween, the head defining a port through which the external connecting members are located in the installed condition, the assembly including a mounting for mounting the head to the body, the mounting being arranged to permit rotation of the head relative to the body around a position on a mounting axis.

* * * * *